US011310659B2

(12) United States Patent
Gandhi et al.

(10) Patent No.: US 11,310,659 B2
(45) Date of Patent: Apr. 19, 2022

(54) TECHNIQUES FOR PROVISIONING AN ENTERPRISE ELECTRONIC SUBSCRIBER IDENTITY MODULE (ESIM) PROFILE FOR AN ENTERPRISE USER

(71) Applicant: Cisco Technology, Inc., San Jose, CA (US)

(72) Inventors: Indermeet Singh Gandhi, San Jose, CA (US); Srinath Gundavelli, San Jose, CA (US); Timothy Peter Stammers, Raleigh, NC (US); Pradeep Kumar Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/925,746

(22) Filed: Jul. 10, 2020

(65) Prior Publication Data

US 2022/0014900 A1 Jan. 13, 2022

(51) Int. Cl.
*H04W 12/45* (2021.01)
*H04W 8/20* (2009.01)
*H04W 8/22* (2009.01)
*H04W 12/069* (2021.01)
*H04W 88/06* (2009.01)

(52) U.S. Cl.
CPC ........... *H04W 8/205* (2013.01); *H04W 8/22* (2013.01); *H04W 12/069* (2021.01); *H04W 88/06* (2013.01)

(58) Field of Classification Search
CPC ..... H04W 8/205; H04W 12/069; H04W 8/22; H04W 12/35; H04W 4/60; H04W 8/18; H04W 12/40; H04W 12/45
See application file for complete search history.

(56) References Cited

U.S. PATENT DOCUMENTS

| 9,137,656 B2 | 9/2015 | O'Leary |
| 10,178,242 B2 | 1/2019 | Guday et al. |

(Continued)

OTHER PUBLICATIONS

GSM Association, "RSP Technical Specification", Version 2.2, Sep. 1, 2017, 264 pages.

(Continued)

*Primary Examiner* — Barry W Taylor
(74) *Attorney, Agent, or Firm* — Edell, Shapiro & Finnan, LLC

(57) ABSTRACT

Presented herein are techniques to facilitate electronic profile management by an enterprise entity in which the enterprise entity can utilize an enterprise infrastructure to provision one or more electronic profiles for one or more enterprise device(s). In one example, a method is provided that may include determining, by a management node of an enterprise network, whether a user equipment (UE) supports an electronic profile capability and a wireless wide area access network connectivity capability; and based on determining that the UE supports the electronic profile capability and the wireless wide area access network connectivity capability, providing, by the management node, at least one electronic profile to the UE via a wireless local area access network of the enterprise network, wherein the at least one electronic profile enables the UE to connect to at least one wireless wide area access network of the enterprise network.

20 Claims, 11 Drawing Sheets

FIG.1

(56) References Cited

U.S. PATENT DOCUMENTS

| | | | |
|---|---|---|---|
| 10,200,837 B1 | 2/2019 | Steck | |
| 10,440,558 B1* | 10/2019 | De Figueiredo Junior | H04W 12/35 |
| 10,484,939 B2* | 11/2019 | Wong | H04W 76/10 |
| 2005/0088999 A1* | 4/2005 | Waylett | H04W 16/18 370/338 |
| 2014/0204927 A1* | 7/2014 | Horn | H04W 76/15 370/338 |
| 2017/0041296 A1* | 2/2017 | Ford | G06F 16/951 |
| 2017/0149795 A1* | 5/2017 | Day, II | H04W 12/086 |
| 2018/0160294 A1 | 6/2018 | Lee et al. | |
| 2018/0206123 A1 | 7/2018 | Guday et al. | |
| 2019/0075453 A1* | 3/2019 | Yoon | H04W 8/245 |
| 2019/0141605 A1* | 5/2019 | Watson | H04W 12/08 |
| 2019/0230510 A1 | 7/2019 | Ben Henda et al. | |
| 2020/0045541 A1 | 2/2020 | Kreishan | |
| 2020/0050439 A1* | 2/2020 | Bjordal | G06F 8/61 |
| 2020/0052907 A1 | 2/2020 | Park et al. | |
| 2020/0106768 A1 | 4/2020 | Lambiase et al. | |
| 2020/0288300 A1* | 9/2020 | Oswal | H04W 8/205 |
| 2021/0051478 A1* | 2/2021 | Avula | H04W 12/72 |
| 2021/0051763 A1* | 2/2021 | Gundavelli | H04W 48/10 |

OTHER PUBLICATIONS

GSM Association, "eSIM Whitepaper", The what and how of Remote SIM Provisioning, Mar. 2018, 21 pages.

Apple Inc., "Mobile Device Management Protocol Reference", Mar. 25, 2019, 227 pages.

GSM Association, RSP Architecture, Version 2.2, Sep. 1, 2017, 95 pages.

Android Open Source Project, "Implementing eSIM", https://source.android.com/devices/tech/connect/esim-overview, May 4, 2020, 14 pages.

Apple Inc., "Update the eSIM Cellular Plan", https://developer.apple.com/documentation/devicemanagement/update_the_esim_cellular_plan, downloaded Jul. 9, 2020, 2 pages.

Anja Jerichow et al., "3GPP Non-Public Network Security", Journal of ICT, vol. 8, No. 1, doi: 10.13052/jicts2245-800X.815, Jan. 4, 2020, 57 pages.

* cited by examiner

| Key | Type | Content |
|---|---|---|
| Status | String | Status codes |
| ErrorChain | Array | Optional. [ErrorCodes] |

FIG.3C

| Status value | Description |
|---|---|
| Acknowledged | Everything went well. |
| Error | An error has occurred. |
| CommandFormatError | A protocol error has occurred. The command may be malformed. |
| Idle | The device is idle (there is no status). |
| NotNow | The device received the command, but cannot perform it at this time. It will poll the server again in the future. |

FIG.3D

| Code | Meaning |
|---|---|
| 50000 | Malformed profile |
| 50001 | Unsupported profile version |
| 50002 | Missing required field |
| 50003 | Bad data type in field |
| 50004 | Empty profile |
| 50005 | Cannot decrypt |
| 50006 | Profile installation failure |
| 50007 | Unsupported field value |
| 50008 | Unsupported eSIM capability |
| 50009 | Max supported eSIM profile reached |

FIG. 3E

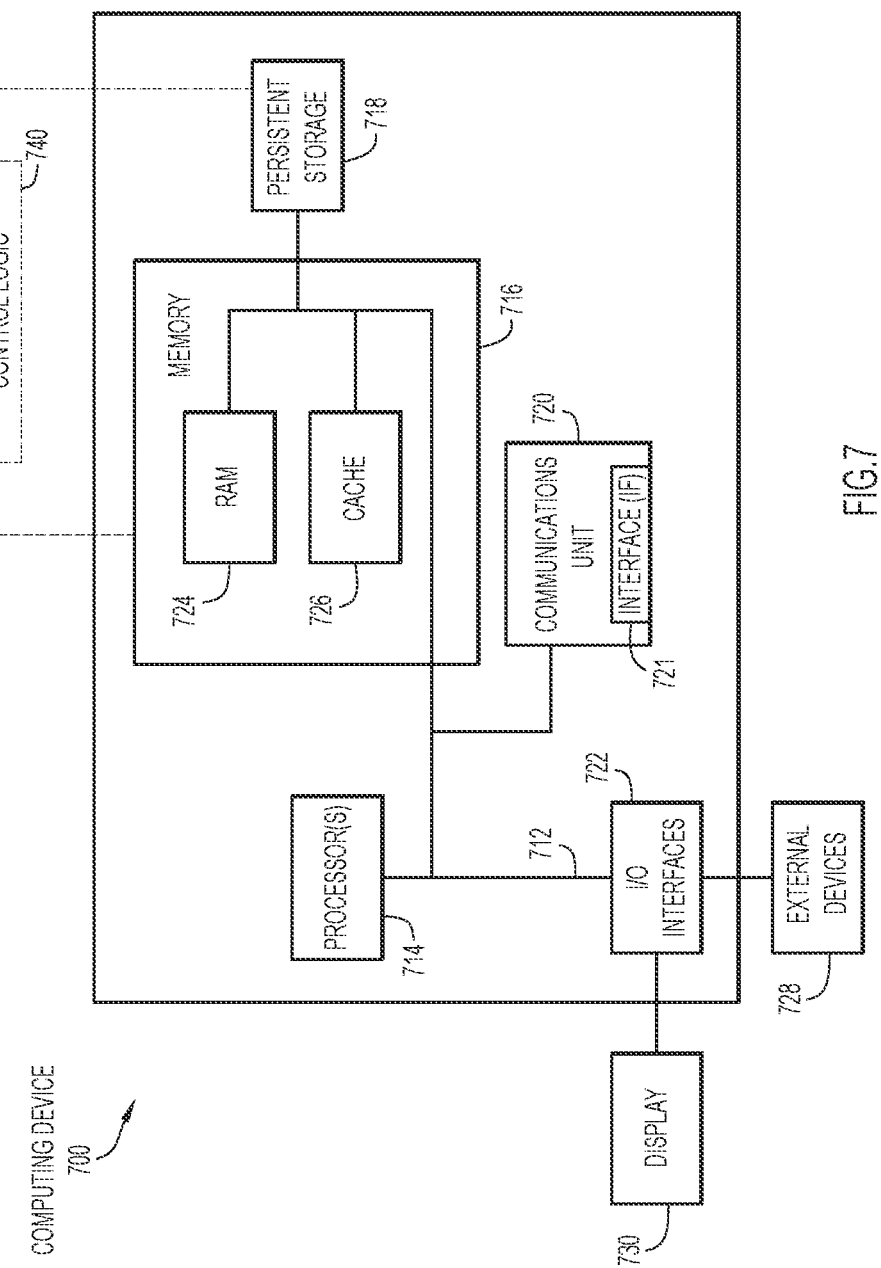

US 11,310,659 B2

TECHNIQUES FOR PROVISIONING AN ENTERPRISE ELECTRONIC SUBSCRIBER IDENTITY MODULE (ESIM) PROFILE FOR AN ENTERPRISE USER

TECHNICAL FIELD

The present disclosure relates to network equipment and services.

BACKGROUND

Networking architectures have grown increasingly complex in communications environments, particularly mobile networking environments. In some cases, a private organization may provide a private mobile network, such a private wireless wide area mobile network, to which authorized users of the private organization can connect for various services. One challenge with providing such a private mobile network is onboarding user devices to the private mobile network.

BRIEF DESCRIPTION OF THE DRAWINGS

FIGS. 3A-3E are schematic diagrams illustrating various example details for various Mobile Device Management (MDM) communications associated with one or more eSIM profile(s) that may be utilized in association with various techniques facilitated via the system of FIG. 1, according to various example embodiments.

FIG. 7 is a hardware block diagram of a computing device that may perform functions associated with any combination of operations described herein in connection with techniques depicted in FIGS. 1-6.

DESCRIPTION OF EXAMPLE EMBODIMENTS

Overview

Figure 1:
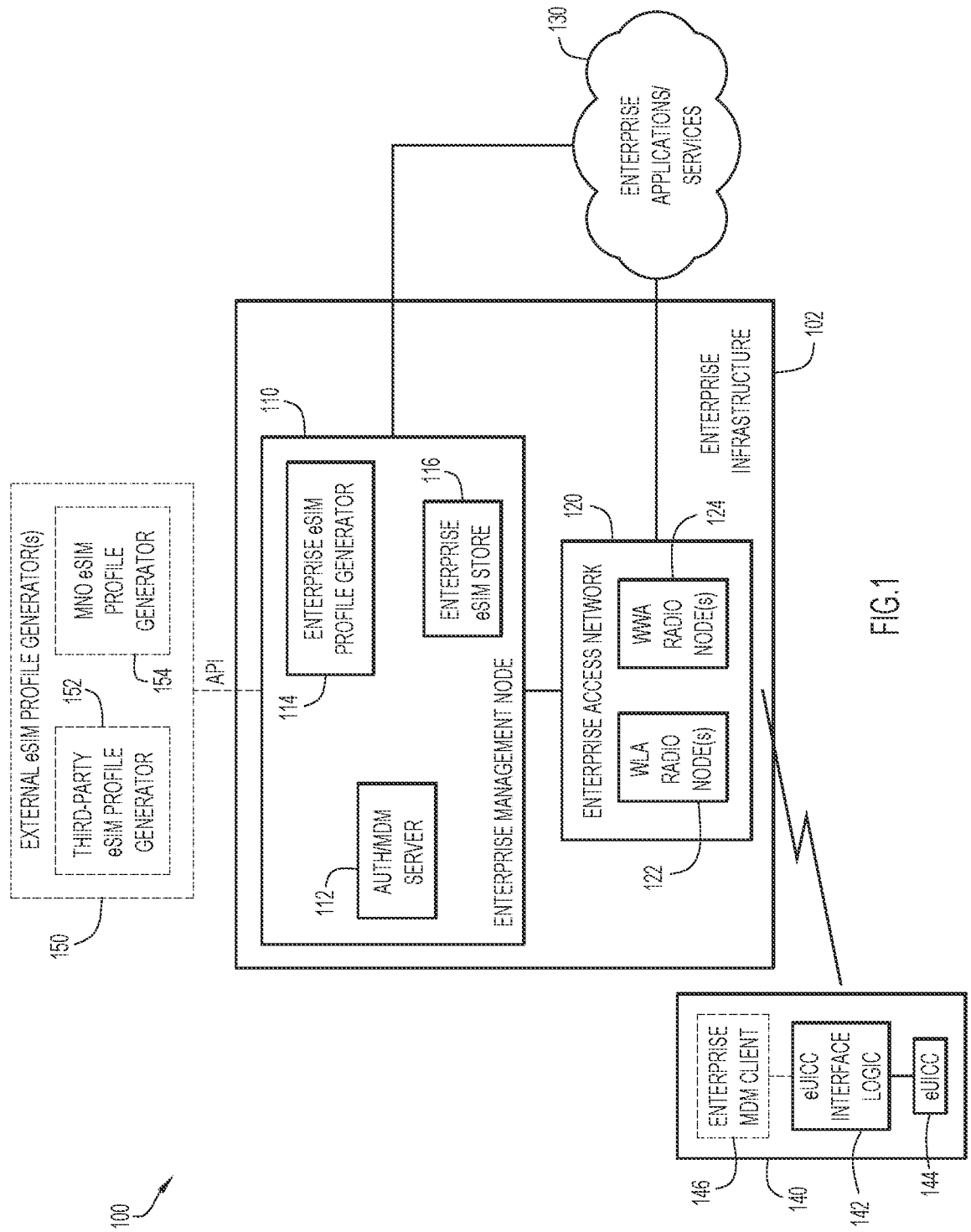
FIG. 1 is a diagram of a system in which techniques may be implemented to facilitate provisioning one or more enterprise electronic subscriber identity module (eSIM) profile(s) for an enterprise user equipment (UE), according to an example embodiment.

Provided herein are techniques that facilitate enterprise embedded or electronic Subscriber Identity Module (eSIM) profile management by an enterprise in which the enterprise can utilize an enterprise infrastructure or system to provision one or more enterprise eSIM profile(s) for one or more enterprise user equipment (UE(s)). The terms embedded SIM and electronic SIM can be used interchangeably to refer to an eSIM.

In at least one example embodiment, a method is provided that may include determining, by a management node of an enterprise network, whether a user equipment (UE) supports an electronic profile capability and a wireless wide area access network connectivity capability; and based on determining that the UE supports the electronic profile capability and the wireless wide area access network connectivity capability, providing, by the management node, at least one electronic profile to the UE via a wireless local area access network of the enterprise network, wherein the at least one electronic profile enables the UE to connect to at least one wireless wide area access network of the enterprise network.

In at least one example embodiment, another method is provided that may include connecting to a wireless local area access network of an enterprise by a user equipment (UE), wherein the UE supports an electronic profile capability and a wireless wide area access network connectivity capability; obtaining, by the UE, at least one electronic profile from the enterprise via the wireless local area access network; and activating the at least one electronic profile for the UE, wherein the at least one electronic profile enables the UE to connect to at least one wireless wide area access network of the enterprise.

EXAMPLE EMBODIMENTS

The Global System for Mobile Communications Association (GSMA) defines a standards-based workflow for remote Subscriber Identity Module (SIM) or electronic SIM (eSIM) provisioning that is typically implemented in public mobile network operator (MNO) deployments that involves a Subscription Manager-Data Preparation (SM-DP) node that is utilized to deliver eSIM profiles to user equipment (UEs) over a standards-based SM-DP+ interface. An eSIM profile may include mobile subscriber and/or device information, such as an International Mobile Subscriber Identity (IMSI) or the like; authentication material, such as authentication algorithms, authentication key(s), or the like; Location Area Identity (LAI); and/or any other information that may enable a device to attach to a wireless wide area (WWA) access network (AN), sometimes referred to as macro or cellular access networks, such as a Third (3rd) Generation Partnership Program (3GPP) Fourth (4th) Generation (4G)/Long Term Evolution (LTE) access network, a Fifth (5th) Generation (5G) access network, a next Generation (nG) access network, and/or the like.

As referred to herein, a wireless wide area (WWA) access network, such as a cellular/3GPP access networks, may be characterized as a Radio Access Network (RAN) having radio nodes (e.g., evolved Node Bs (eNBs or eNodeBs), next generation Node Bs (gNBs or gNodeBs, etc.) that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio nodes. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

For the current workflow defined in GSMA's Remote SIM provisioning specifications, eSIM profiles are typically owned and managed by a Service Provider (SP). The currently defined GSMA workflow is public mobile network operator-centric in that a new device is typically manufactured with a pre-loaded bootstrapping profile that allows only a specific operator associated with that bootstrapping profile to add/delete new eSIM profiles onto an embedded Universal Integrated Circuit Card (eUICC) included in the device. Any time a new eSIM profile is to be downloaded to the device, the mobile user is expected to contact to the operator/SP and have the SP securely package the profile and deliver it to the device/eUICC over the SM-DP+ interface.

This approach of public mobile network operator-centric workflow is detrimental to private WWA access network (e.g., private cellular) adoption by enterprises that are increasingly seeking to integrate WWA accesses such as Citizens Broadband Radio Service (CBRS) access to obtain access to shared spectrum in combination with and/or in lieu of enterprise wired (e.g., Ethernet, etc.) and/or WLA radio accesses (e.g., Wi-Fi®). Similarly, enterprises are also increasingly seeking to integrate private 3GPP accesses, such as 3GPP 4G/LTE, 5G, and/or nG into enterprise networks in combination with and/or in lieu of enterprise wired and/or WLA accesses.

By 'private' it is meant that a private WWA access network (e.g., a CBRS access network and/or a cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a non-public network (NPN) in some instances. Cisco is a registered trademark of Cisco Technology, Inc. AT&T is a registered trademark of AT&T Intellectual Property.

In the current GSMA Remote SIM provisioning model, each enterprise is to have a business relationship with a public MNO/SP or a third-party provisioning entity that is to manage the eSIM delivery infrastructure using MNO/SP operated SM-DP+ functions for enterprise users. There is a financial cost associated with this this GSMA-defined MNO/SP approach as the enterprises have to rely on third-party entities for user on-boarding to enterprise private WWA access networks. Further, the GSMA-defined MNO/SP approach not only increases the complexity/financial cost of user on-boarding (providing access, services, etc.) to an enterprise's private WWA access network, but also brings new third-party eSIM providers, such as Gemalto®, etc. into the enterprise user on-boarding process, which is a departure from the current enterprise user on-boarding approach for providing enterprise WLA access. Gemalto is a registered trademark of Thales.

Additionally, there is also a security risk in the current GSMA-defined MNO/SP approach involving exposing each employee/enterprise device to access a third-party (MNO/SP) network directly to obtain an eSIM profile. This can be further aggravated if an enterprise prefers to allocate multiple eSIM profiles to the employees. For example, an enterprise may provide one eSIM profile to be used for external customer calls and one eSIM profile for internal purposes. In another example, a conglomerate may provide separate eSIM profiles for each of its business chains (hotels, retail, Information Technology (IT), etc.) for its employees. Provisioning multiple eSIM profiles to enterprise devices using the currently defined GSMA MNO/SP workflow may potentially involve multiple financial costs, security risks, etc.

Thus, it would be advantageous for an enterprise to have control over the management and delivery of the eSIM profiles for its enterprise users. To achieve such a goal, proposed herein is a technique that facilitates eSIM profile management by an enterprise in which the enterprise can utilize an enterprise infrastructure or system to provision one or more eSIM profiles for one or more enterprise UE(s).

Referring to FIG. 1, FIG. 1 is a block diagram of a system 100 in which techniques may be implemented to facilitate provisioning one or more eSIM profile(s) for an enterprise UE, according to an example embodiment. System 100 may include an enterprise management platform or node 110, an enterprise access network 120, and enterprise applications and/or services (applications/services) 130. Also shown in FIG. 1 is an enterprise device, such as an enterprise UE 140.

Generally, enterprise management node 110 and enterprise access network 120 may be considered an enterprise infrastructure 102, such as an enterprise network and/or the like, which may be managed and/or operated by an enterprise entity to serve enterprise purposes (e.g., business purposes, government purposes, educational purposes, etc.) and in which the enterprise network may be implemented as a LAN, a WAN, an SD-WAN, combinations thereof, and/or the like. Enterprise management node 110 may interface with various elements of system 100 including, but not limited to, enterprise access network 120, and enterprise applications/services 130. Enterprise access network 120 may also interface with enterprise applications/services 130 (e.g., via radio node(s) 122/124 within enterprise access network 120). Enterprise access network 120 may facilitate over-the-air Radio Frequency (RF) connections with one or more enterprise devices (e.g., enterprise UE) via WLA radio node(s) 122 and WWA radio node(s) 124.

In at least one embodiment, enterprise management node 110 may include an authentication (auth) and Mobile Device Management (MDM) server 112 (auth/MDM server 112), an enterprise eSIM profile generator 114, and an enterprise eSIM store 116. In at least one embodiment, enterprise management node 110 may be inclusive of an Enterprise Management Platform and may be implemented as a Cisco® Digital Network Architecture Center (DNA-C).

In various embodiments, auth/MDM server 112 may be inclusive of any hardware, software, logic, etc. that operates to facilitate authentication and/or MDM operations for enterprise management node 110. In general, the term 'Mobile Device Management' or 'MDM' may refer to a management protocol that may an enterprise entity may utilize to facilitate management of one or more enterprise devices (e.g., enterprise UE 140) through various MDM communications (e.g., MDM commands, requests, responses, etc.).

Authentication services may include authenticating and/or authorizing one or more device(s) to connect to enterprise infrastructure 102 and may be inclusive of any Authentication, Authorization, and Accounting (AAA) services that may be facilitated via any combination of authentication/authorization protocols such as Remote Authentication Dial- In User Service (RADIUS), DIAMETER, Extensible Authentication Protocol (EAP) [including any EAP variations], combinations thereof, and/or the like. Although illustrated as a combined node for the embodiment of FIG. 1, it is to be understood that auth/MDM server 112 may be inclusive of multiple network nodes, elements, etc.

Enterprise eSIM profile generator 114 may be inclusive of any combination of hardware, software, logic, etc. that may generate one or more eSIM profiles for use by one or more enterprise devices, such as enterprise UE 140, within system 100. In various embodiments, one or more eSIM or electronic profile(s) that may be utilized in accordance with embodiments herein may be formatted according to GSMA specifications and may include any combination of standards-defined and/or enterprise-defined information including, but not limited to, an IMSI or the like; authentication material, such as authentication algorithms, an authentication key, or the like; Location Area Identity (LAI); and/or any other information [e.g., subscription information, employee identifier (badge number, etc.), employee name, employee badge number, employee department/group/class/tier (management, IT, engineering, gold, bronze, etc.), enterprise locations (sites, facilities, floors, etc.), combinations thereof, and/or the like] that may enable an enterprise user/device, such as enterprise UE 140, to attach to enterprise access network 120 via one or more WWA radio node(s) 124 for one or more 3GPP 4G/5G/nG, CBRS, and/or the like communications. Broadly, an eSIM profile may also be referred to herein interchangeably as an 'electronic profile' that may enable an enterprise user/device, such as enterprise UE 140, to attach to enterprise access network 120 via one or more WWA radio node(s) 124 for one or more 3GPP 4G/5G/nG, CBRS, and/or the like communications.

Enterprise eSIM store 116 may be any storage element, node, etc. (e.g., a database, etc.) that may facilitate storing one or more eSIM profiles for one or more enterprise employees/devices (e.g., enterprise UE 140). In some instances, an enterprise employee/device may be associated with multiple eSIM profiles, as discussed herein. Although illustrated as separate entities, it is to be understood that enterprise eSIM profile generator 114 and enterprise eSIM store 116 may be implemented as a combined entity in some embodiments.

In some embodiments, enterprise management node 110 may interface with one or more external eSIM profile generator(s) 150 via an Application Programming Interface (API). In various embodiments, external eSIM profile generator(s) may include any combination of a third-party eSIM profile generator 152 and/or a mobile network operator (MNO) eSIM profile generator 154, which may be inclusive of any eSIM profile that may generate an eSIM profile for use within system 100.

Generally, enterprise applications/services 130 may be inclusive of any applications/services (e.g., email applications, collaboration applications, video conferencing applications, etc.) offered by the enterprise entity associated with enterprise infrastructure for one or more enterprise devices (e.g., enterprise UE 140). In various instances, enterprise applications/services may be provisioned internally within enterprise infrastructure 102 and/or externally from enterprise infrastructure (e.g., via one or more network clouds, etc.).

Enterprise access network 120 may include one or more WLA radio node(s) 122 (e.g., Wi-Fi® access point(s)) and one or more WWA radio node(s) (e.g., CBRS radio devices (CBSDs), 4G/LTE radio devices such as eNBs/eNodeBs, 5G and/or nG radio devices such as gNBs/gNodeBs, and/or the like). Enterprise access network 120 may also facilitate wired connectivity (e.g., Ethernet, etc.) among elements/devices. Although not illustrated in FIG. 1, it is to be understood that WLA radio node(s) 122 may include any combination of hardware (e.g., communications units, receiver(s), transmitter(s), antenna(s) and/or antenna array (s), processor(s), memory element(s), baseband processor(s) (modems), etc.)], controllers, software, logic, and/or the like to facilitate over-the-air Radio Frequency (RF) WLA RAN connections (e.g., Wi-Fi® connections) with one or more enterprise devices (e.g., enterprise UE 140). Further, it is to be understood that WWA radio node(s) 124 may include any combination of hardware (e.g., communications units, receiver(s), transmitter(s), antenna(s) and/or antenna array (s), processor(s), memory element(s), baseband processor(s) (modems), etc.)], controllers, software, logic, and/or the like to facilitate over-the-air RF WWA RAN connections (e.g., 4G/5G/nG, CBRS, etc. connections) with one or more enterprise devices (e.g., enterprise UE 140).

Enterprise UE 140 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. Enterprise UE 140 discussed herein may also be inclusive of a suitable interface to a human user such as a microphone, a display, a keyboard, or other terminal equipment. Enterprise UE 140 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. Although not illustrated in FIG. 1, it is to be understood that enterprise UE 140 may also include any combination of hardware (e.g., communications units, receiver(s), transmitter(s), antenna(s) and/or antenna array (s), processor(s), memory element(s), baseband processor(s) (modems), etc.)], controllers, software, logic, and/or the like to facilitate any combination of over-the-air RF WLA and/or WWA access network connections. In some instances, enterprise UE 140 may also be capable of wired interface connections.

Enterprise UE 140 may include an embedded Universal Integrated Circuit Card (eUICC) 144 and eUICC interface logic 142. In at least one embodiment, enterprise UE 140 may also include an enterprise MDM agent or client 146. In such embodiments, enterprise MDM client 146 may be inclusive of any combination of hardware, software, logic, etc. that facilitates MDM communications (e.g., commands, requests, responses, etc.) between UE 140 and auth/MDM server 112 in order to facilitate obtaining, managing, etc. one or more eSIM profile(s) for enterprise UE 140 based, at least in part, on exchanges between enterprise MDM client 146 and auth/MDM server 112. Generally, the eUICC interface logic 142 may interface with eUICC 144 and, if implemented, enterprise MDM client 146 may interface with eUICC interface logic. In at least one embodiment, enterprise MDM client 146 may be implemented as the Cisco® Meraki® Systems Manager or any other enterprise Connection Manager Application. Meraki® is a registered trademark of Meraki, LLC, a wholly owned subsidiary of Cisco Systems, Inc. In various embodiments, eUICC interface logic may be implemented as an Android® Local Profile Assistant (LPA) and/or the like (e.g., similar logic that may be utilized for other operating systems). Android® is a registered trademark of Google LLC.

The eUICC interface logic 142 may be inclusive of any combination of hardware, software, logic, etc. that may facilitate the capability to manage one or more eSIM profile (s), which may include downloading or otherwise provisioning one or more (potentially encrypted) eSIM profiles to the eUICC 144 of enterprise UE 140. The eUICC interface logic 142 may interface with eUICC 144 via any combination of GSMA-defined ES10 interfaces, such as ES10a, ES10b, and ES10c interfaces, referred to herein collectively as the 'ES10x' interface. In some instances, eUICC interface logic 142 may facilitate a user interface (UI) to facilitate management of eSIM profile(s) by one or more employee(s)/user(s) of enterprise UE 140. For example, if eUICC interface logic 142 is implemented as an LPA an LPA UI or LUI. For embodiments in which enterprise MDM client 146 may not be configured for enterprise UE 140, eUICC interface logic 142 functionality on enterprise UE 140 can be extended and/or otherwise enhanced to provide custom eUICC interface logic that include enterprise MDM client logic (shown in FIG. 5B, discussed below) that facilitates interfacing with auth/MDM server 112 to obtain one or more enterprise auth/MDM server 112 provided eSIM profile(s) and push the one or more eSIM profile(s) to eUICC 144 over the ES10x interface(s) between eUICC interface logic 142 and eUICC 144 of enterprise UE 140.

The eUICC 144 may be inclusive of any system, functions, etc. involving any combination hardware, software, logic, etc. that may facilitate installing or uninstalling (deleting) one or more eSIM profiles for enterprise UE 140. Although not illustrated in FIG. 1, eUICC 144 may include a eUICC controller and a eUICC card controller, which are discussed in further detail below with regard to FIGS. 3A and 3B. An enterprise MDM client, which may be a standalone client such as enterprise MDM client 146 or enterprise MDM client logic configured for customized eUICCinterface logic, may facilitate activating and/or deactivating one or more installed eSIM profiles for various embodiments described herein. One or more enterprise eSIM profiles may be installed, activated, deleted, and/or deactivated for the eUICC 144 of enterprise UE 140 utilizing various techniques as discussed for various embodiments described herein.

Through techniques discussed herein, enterprise infrastructure 102 may facilitate provisioning one or more eSIM profile(s) for the enterprise UE 140. The MDM infrastructure provided via enterprise infrastructure 102 can be enhanced to deliver one or more eSIM profile(s) to enterprise devices, such as enterprise UE 140.

Figure 2:
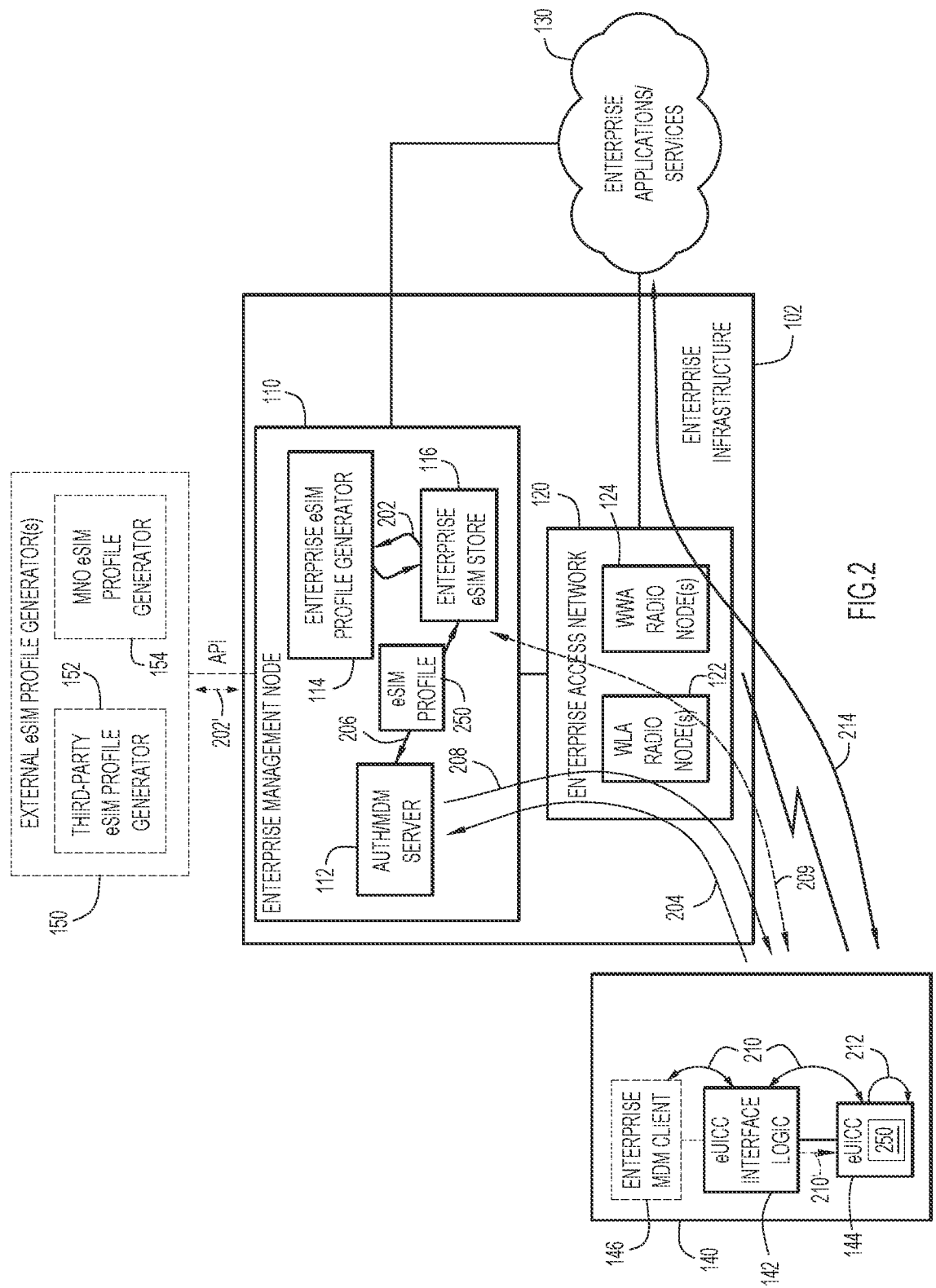
FIG. 2 is a diagram illustrating example operations that may be utilized to provision one or more enterprise eSIM profile(s) for an enterprise UE within the system of FIG. 1, according to an example embodiment.

Consider an operational example as shown in FIG. 2, which is a diagram illustrating example operations that may be utilized to provision one or more eSIM profiles for enterprise UE 140 using various techniques for eSIM profile delivery and activation (and/or deactivation/deletion, in some instances) within system 100 of FIG. 1 in accordance with embodiments provided herein. FIGS. 3A-3E are schematic diagrams illustrating various example details for various MDM communications associated with one or more eSIM profile(s) that may be utilized in association with various techniques facilitated via the system of FIG. 1, according to an example embodiment. FIGS. 3A-3E are discussed below in connection with various techniques illustrated via FIG. 2.

As noted previously, for embodiments in which enterprise MDM client 146 may not be configured for enterprise UE 140, eUICC interface logic 142 functionality on enterprise UE, can be enhanced to interface with auth/MDM server 112 in order to download and push one or more eSIM profile(s) to eUICC 144 of enterprise UE 140. Further as noted previously, an eSIM profile generation function can be provided via enterprise eSIM profile generator 114 of enterprise management node 110 in some embodiments, and/or, in some embodiments, enterprise management node 110 may be configured with an API to interface with one or more external eSIM profile generator(s) 150 to obtain eSIM profiles in bulk for its use.

Broadly, operations and/or features that may be provided via system 100 may include, but not be limited to: facilitating the allocation and assignment of one or more eSIM profile(s) by auth/MDM server 112 depending on the eSIM profile capability of an enterprise device, such as enterprise UE 140; facilitating one or more new MDM protocol extensions to enable one or more enterprise device(s) to download one or more eSIM profile(s) to the device; providing one or more extension(s) to MDM command(s) and/or messaging (e.g., via MDM command codes, MDM status codes, MDM payloads, etc.) to install, activate, deactivate, and/or uninstall (delete) one or more eSIM profile(s) for one or more device(s) that may or may not be configured with an MDM agent or client; enhancing auth/MDM server 112 to generate, transmit, receive, and/or otherwise process such commands to install, activate, deactivate, and/or uninstall (delete) one or more eSIM profile(s) for one or more device(s); providing, in at least one embodiment, extension(s) to eUICC interface logic functionality for an enterprise device to use enterprise auth/MDM server 112 provided eSIM profile(s) and push the profile(s) to the eUICC of the device; and/or providing an auth/MDM server 112 capability to activate and/or deactivate one or more of eSIM profile(s) for one or more enterprise device(s) based on enterprise policies (e.g. one or more first policies for an employee when the employee is located at a San Jose campus of an enterprise entity and one or more second policies when the employee is visiting a Berlin campus of the enterprise entity having a private LTE access network).

Consider, at 202 that enterprise management node 110 maintains and/or otherwise manages enterprise eSIM store 116 for enterprise user devices (e.g., enterprise UE 140). In at least one embodiment, eSIM management may include generating one or more eSIM profile(s) for one or more enterprise user(s)/UE(s), such as enterprise UE 140, via standalone enterprise eSIM profile generator 114 and storing the eSIM profile(s) in enterprise eSIM store 116. In some embodiments, as shown at 202', eSIM management may include interfacing with one or more external eSIM generator(s) 150, such as third-party eSIM profile generator 152 and/or MNO eSIM profile generator 154, via an API to facilitate obtaining one or more eSIM profile(s) and storing the profile(s) in enterprise eSIM store 116.

At 204, consider that enterprise UE 140, having an eSIM profile capability (e.g., capable of obtaining and installing/activating one or more eSIM profile(s)) and a WWA access network connectivity capability (e.g., capable of connecting to a WWA access network via one or more WWA radio node(s) 124) enrolls with the enterprise entity via auth/

MDM server 112 over an existing connection, such as a WLA access network (e.g., Wi-Fi®) connection. The operations at 204 may include auth/MDM server 112 determining the eSIM profile capability and the WWA access network connectivity capability of the enterprise UE 140. For example, the enterprise UE 140 may be any combination of: 1) eSIM profile capable and capable of WWA access network connectivity (e.g., 3GPP cellular capable, CBRS capable, etc. capable); 2) eSIM profile capable and not capable of WWA access network connectivity; or 3) neither eSIM capable nor capable of WWA access network connectivity.

In at least one embodiment, the eSIM profile capability and WWA access network connectivity capability of a given enterprise UE can be determined during authentication of the UE to the enterprise infrastructure 102 through a WLA access network connection via a given WLA radio node 122 as the UE seeks to connect to the enterprise infrastructure 102 and is authenticated via auth/MDM server 112.

For example, in one implementation, the enterprise UE 140 may present its eSIM profile capability and capable of WWA access network connectivity via a certificate of the enterprise UE 140 presented during WLA access network authentication and/or association with auth/MDM server 112 such that the auth/MDM server 112 can determine if the enterprise UE 140 is both eSIM profile capable and capable of WWA access network connectivity. In another example, the enterprise UE may include its eSIM profile capability and WWA access network connectivity capability as one or more attributes sent to auth/MDM server 112 during Wi-Fi® association/authentication in which enterprise MDM client interacts 146 or enterprise MDM client logic interacts with auth/MDM server 112. For such interactions, the auth/MDM server 112 may, in some embodiments, perform one or more checks via one or more databases, etc. to determine/obtain capabilities of an enterprise device including eSIM support, WWA access network connectivity capability, etc. In various embodiments, eSIM profile capability and WWA access network connectivity capability attributes can be sent via any combination of information elements (IE), Type-Length-Value (TLV) objects, flags, numeric values, bits, strings, and/or any other appropriate indicator.

For embodiments herein, it is assumed that enterprise UE 140 is both eSIM profile capable and WWA access network connectivity capable. For an enterprise UE that is not eSIM profile and/or not WWA access network connectivity capable, no eSIM profile may be loaded to the device.

Continuing with the present example, consider at 206, that auth/MDM server 112, upon determining that the enterprise UE 140 is both eSIM profile capable and WWA access network connectivity capable, allocates an eSIM profile, shown in FIG. 2 as eSIM profile 250, to the user (e.g., enterprise employee) associated with enterprise UE 140 and assigns the eSIM profile 250 to enterprise UE 140 via enterprise eSIM store 116. This allocation and assignment ensures tying an eSIM profile to a device (e.g., eSIM profile 250 assigned to enterprise UE 140) as well as ensuring similar policies can be governed on multiple eSIM capable devices linked to the same enterprise employee/user.

For example, a user may have multiple devices, each being sSIM and WWA access capable (eSIM+WWA access capable). Through allocation and assignment, auth/MDM server 112 can allocate and assign eSIM profiles to the different devices, while ensuring that the policies (e.g., enterprise policies) contained in the eSIM profiles are consistent across different devices belonging to a same user. Policies may include, for example, connecting to a particular network at a particular enterprise side, different classes of service, calling plans, different throughput, data caps, etc. In various embodiments, allocation and assignment can include maintaining a database that identifies correlations, links, etc. between users, user devices, each eSIM profile assigned to each device for each user, each policy assigned to each user/user device.

Upon allocation and assignment, the eSIM profile 250 may be delivered to enterprise UE. Delivery of an eSIM profile to an enterprise UE can be performed using a variety of techniques using various MDM command or message extensions.

For example, in at least one embodiment, auth/MDM server 112 can deliver the eSIM profile 250 to enterprise device 140 within an MDM payload of an MDM command sent to enterprise UE 140, as shown at 208, that instructs the enterprise UE to initiate download the eSIM profile 250 as contained in the MDM payload to the eUICC 144.

In another embodiment, auth/MDM server 112 can send an MDM command to enterprise UE 140 that triggers the enterprise UE 140 to download the eSIM profile from a network location identified in the MDM command. For example, in at least one implementation, auth/MDM server 112 can send an MDM command to enterprise UE 140 that triggers enterprise MDM client 146 on the device to download the eSIM profile 250 from enterprise eSIM store 116 via the WLAN, as shown at 209. In such an implementation, the MDM message can include a network location identifier, such as a Uniform Resource Locator (URL) (web address) for the eSIM profile 250 within enterprise eSIM store 116 from which enterprise UE 140 can download the eSIM profile via the WLAN.

As referred to herein, the terms 'command', 'response', 'message', and variations thereof can be used interchangeably. Referring to FIGS. 3A-3E, FIGS. 3A-3E are schematic diagrams illustrating various example details for various MDM protocol commands/messages that may be utilized in accordance with techniques presented herein.

Figure 3A:
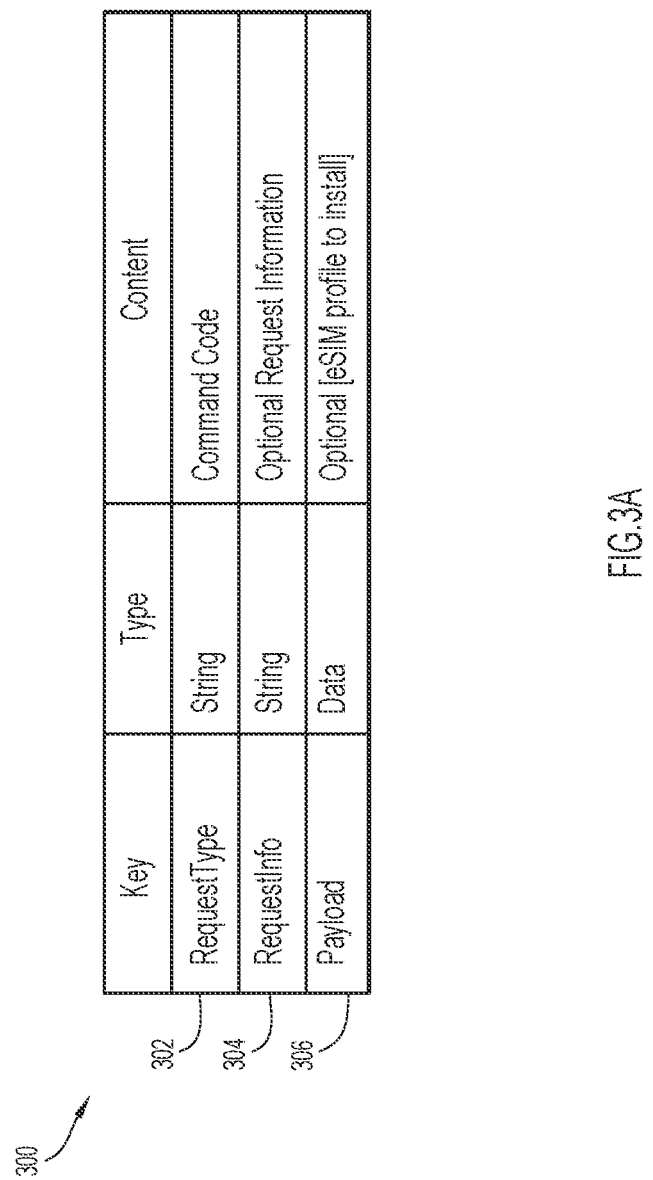

Referring to FIG. 3A, FIG. 3A illustrates an example format for an MDM protocol command 300 that may be utilized for sending MDM commands from an auth/MDM server to an enterprise MDM client or logic implemented for a given enterprise UE (e.g., for MDM protocol commands sent from auth/MDM server 112 to enterprise UE 140). The MDM protocol command 300 may include a Request Type (RequestType) field 302, optionally, a Request Information (RequestInfo) extension field 304 and/or, optionally, a data payload (Payload) 306.

The RequestType field 302 may include a Command Code, as discussed in further detail below with reference to FIG. 3B. The RequestInfo extension field 304 may include optional request information, also discussed with referent to FIG. 3B. The Payload 306 may include an eSIM profile to install and activate for a device (e.g., enterprise UE 140).

Figure 3B:
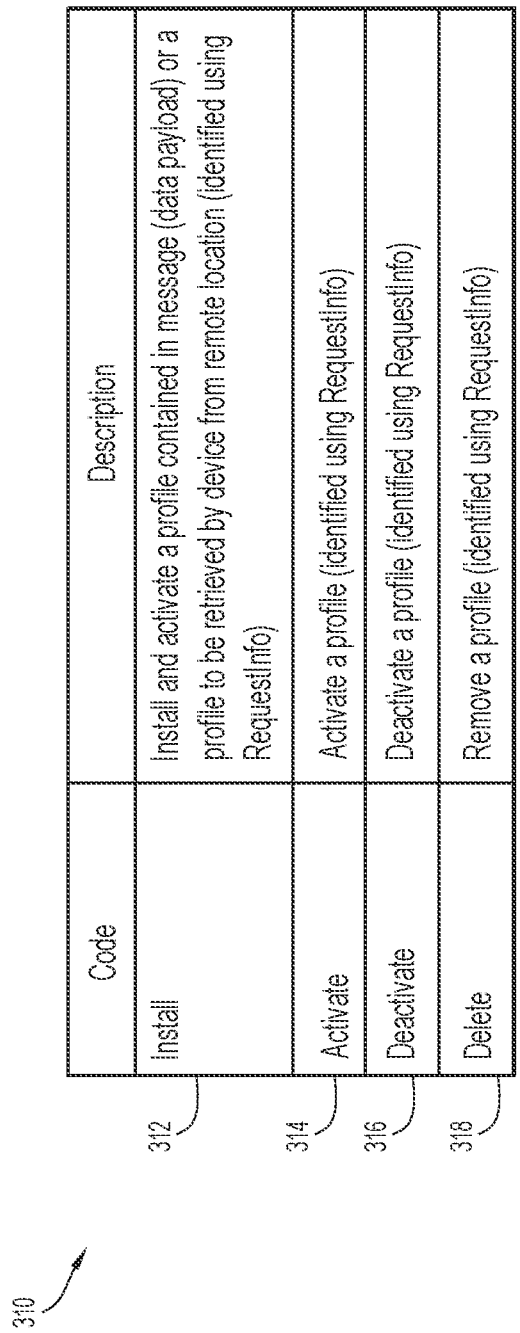

FIG. 3B illustrates various example Command Codes 310 that may be utilized for the MDM command 300 in various embodiments, such as, an Install command code 312, an Activate command code 314, a Deactivate command code 316, and a Delete command code 318.

The Install command code 312 may be utilized instruct a device to install and activate an eSIM profile either contained in the Payload 306 or an eSIM profile that is to be retrieved by the device via a network location identified via the RequestInfo extension field 304 (e.g., 'www.enterpriseesimstore116.com/profile250' identifying the location from which to download eSIM profile 250 from enterprise eSIM store 116). In at least one embodiment, the enterprise UE 140 can check for the presence of a URL in the RequestInfo extension field 304 to trigger downloading, installing, and activating the eSIM profile 250 from enterprise eSIM store 116 or can determine the presence of eSIM profile 250 contained in Payload 306 to initiate downloading, installing, and activating the eSIM profile from the Payload 306.

In some embodiments, multiple eSIM profiles may be installed for an enterprise UE. For example, in some implementations multiple network locations may be identified at which a device can obtain the multiple eSIM profiles or multiple eSIM profiles may be included in the Payload 306. In still some implementations, different eSIM profiles may be installed for an enterprise UE at different times (e.g., when the UE connects to an enterprise infrastructure at a first site, a first eSIM profiled may be installed, when the UE connects at a second site, a second eSIM profile may be installed, etc.). Other variations for installing multiple eSIM profiles for an enterprise UE can be envisioned.

For embodiments in which multiple eSIM profiles may be installed for enterprise UE 140, the Activate command code 314 can optionally be utilized to activate a particular eSIM profile for the enterprise UE 140 in which the particular eSIM profile to be activated can be identified via the RequestInfo extension field 304 (e.g., 'profile250'). The Deactivate command code 316 can optionally be utilized to deactivate a particular eSIM profile for the enterprise UE 140 in which the particular eSIM profile to be deactivated can be identified via the RequestInfo extension field 304. The Delete command code 318 may be utilized to instruct an enterprise UE to delete or deactivate and delete a particular eSIM profile in which the particular eSIM profile can be identified via the RequestInfo extension field 304.

Referring to FIG. 3C, FIG. 3C illustrates an example an MDM protocol response 320 that may be utilized for sending MDM protocol responses from an enterprise MDM client or logic implemented for a given enterprise UE to an auth/MDM server in response to one or more MDM protocol commands received by the enterprise UE. (e.g., MDM protocol responses sent from enterprise UE 140 for MDM protocol commands obtained from auth/MDM server 112). The MDM protocol response 320 may include a status (Status) field 322 and, optionally an error chain (ErrorChain) extension field 324.

Various example Status values 330, including, an Acknowledged status value 332, an Error status value 334, a CommandFormatError status value 336, an Idle status value 338, and a NotNow status value 340 are illustrated in FIG. 3D along with example explanations regarding each value.

For instances in which one or more errors may occur related to installing one or more eSIM profile(s), an enterprise UE may include one or more error codes (ErrorCode) within ErrorChain extension field 324. Various example ErrorCodes 350 and corresponding explanations of such codes are illustrated in FIG. 3E.

It is to be understood that the example information, formats, fields, statuses, codes, etc. illustrated for FIGS. 3A-3E are provided for illustrative purposes only and are not meant to limit the broad scope of the techniques described herein. Virtually any other information, formats, fields, statuses, codes, etc. may be utilized to exchange MDM messaging between an enterprise infrastructure and one or more enterprise UE(s) in connection with provisioning, managing, etc. one or more eSIM profile(s) for one or more enterprise UE(s) and, thus, are clearly within the scope of techniques embodied herein.

Thus, one or more eSIM Profile(s) can be pushed to an enterprise UE on an existing connection (e.g., WLAN connection) using one or more new MDM protocol messages, extension(s), etc. as illustrated in FIGS. 3A-3E.

Returning to the operational example of FIG. 2, the enterprise UE 140 may install and activate the downloaded eSIM profile 250. In one embodiment, assuming, for example, that enterprise MDM client 146 is implemented for enterprise UE 140, enterprise MDM client 146 can use an existing operating system (OS) framework for enterprise UE to install and activate eSIM profile to eUICC 144, as shown at 210 and 212. For example, in at least one implementation, enterprise MDM client 146 may enable utilizing an Android® framework that provides standard (eUICC) APIs for accessing and/or managing subscription profiles (eSIM profiles) on the eUICC via the eUICC interface logic 142 implemented via an LPA and the ES10x interface.

In another embodiment, for example, if eUICC interface logic 142 is a implemented as custom logic including enterprise MDM client logic configured therein, auth/MDM server 112 may communicate with the custom eUICC interface logic for downloading eSIM profile to enterprise UE. In such an embodiment, eUICC interface logic 142 can interface with eUICC 144 via the ES10x interface to install/activate eSIM profile 250, as shown at 210' and 212. As noted previously, management of eSIM profiles on eUICC 144 can be performed by eUICC interface logic 142.

In some implementations, an user interface (UI) can be provided via eUICC interface logic 142 to provide an end user and/or enterprise MDM client 146 to manage multiple embedded (downloaded) subscription profiles.

Once eSIM profile 250 is installed and activated on enterprise UE 140, the user/enterprise UE 140 can connect to a WWA radio node 124 and start using a WWA access network connection (e.g., a CBRS connection) to access enterprise applications/services 130, as shown at 214.

Thus, system 100 may facilitate delivering and activating one or more eSIM profile(s) for one or more enterprise device(s), such as enterprise UE(s) 140, using various techniques provided herein.

Figure 4:
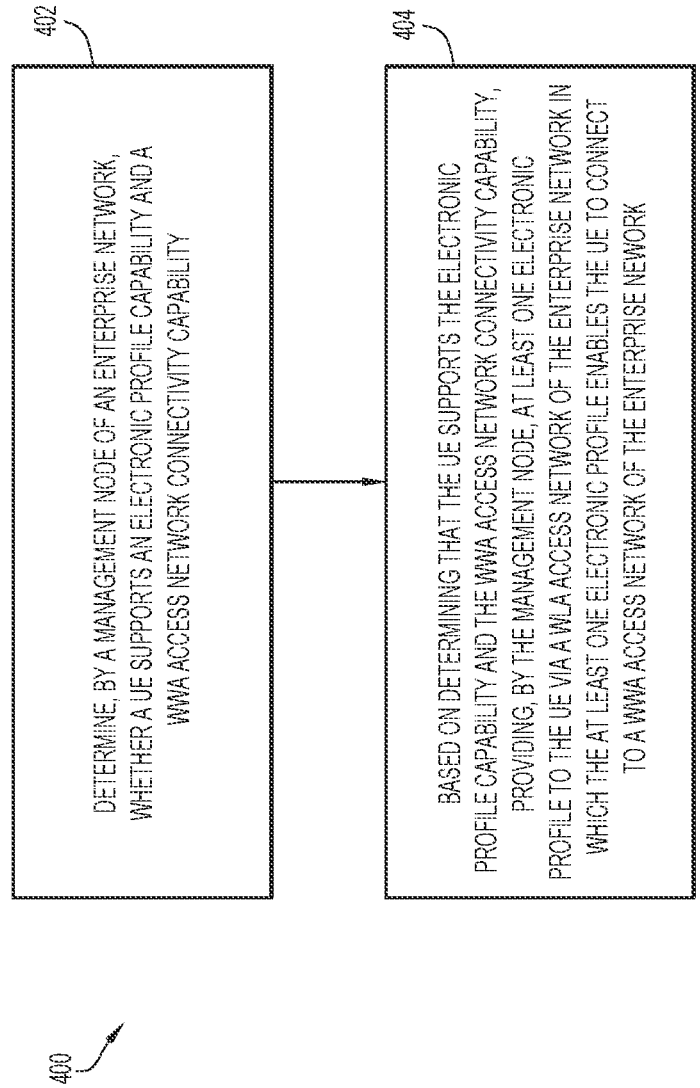
FIG. 4 is a flow chart depicting a method according to an example embodiment.

Referring to FIG. 4, FIG. 4 is a flow chart depicting a method 400 according to an example embodiment. In particular, method 400 illustrates example operations that may be performed, at least in part, by a management node of an enterprise network, such as enterprise management node 110 in at least one embodiment.

At 402, the method may include determining, by the management node of the enterprise network, whether a UE supports an electronic profile capability (e.g., eSIM profile capability) and a WWA access network connectivity capability (e.g., 4G/5G/nG, CBRS, etc. capability). In at least one embodiment, the capabilities of the UE can be determined based on a certificate associated with the UE obtained by the management node. In at least one embodiment, the capabilities of the UE can be determined based on capability information obtained by the management node through association/authentication of the UE to a WLA access network of the enterprise network.

At 404, based on determining that the UE supports the electronic profile capability and the WWA access network connectivity capability, the method may include providing, by the management node, at least one electronic profile (e.g., eSIM profile) to the UE via a WLAN of the enterprise network in which the at least one electronic profile enables the UE to connect to at least one WWA access network of the enterprise network. In at least one embodiment, providing the at least one electronic profile to the UE may include sending an MDM protocol command to the UE via the WLA access network of the enterprise network.

In at least one embodiment, the MDM protocol command indicates that the UE is to install and activate the at least one electronic profile and the at least one electronic profile is included with the MDM protocol command. In at least one embodiment, the MDM protocol command indicates that the UE is to install and activate the at least one electronic profile and a network location of the at least one electronic profile is included with the MDM protocol command. Upon installing and activating the at least one electronic profile, the UE can connect to at least one WWA access network of the enterprise network (e.g., a private 4G/5G/nG network, a private CBRS network, etc.).

Figure 5A:
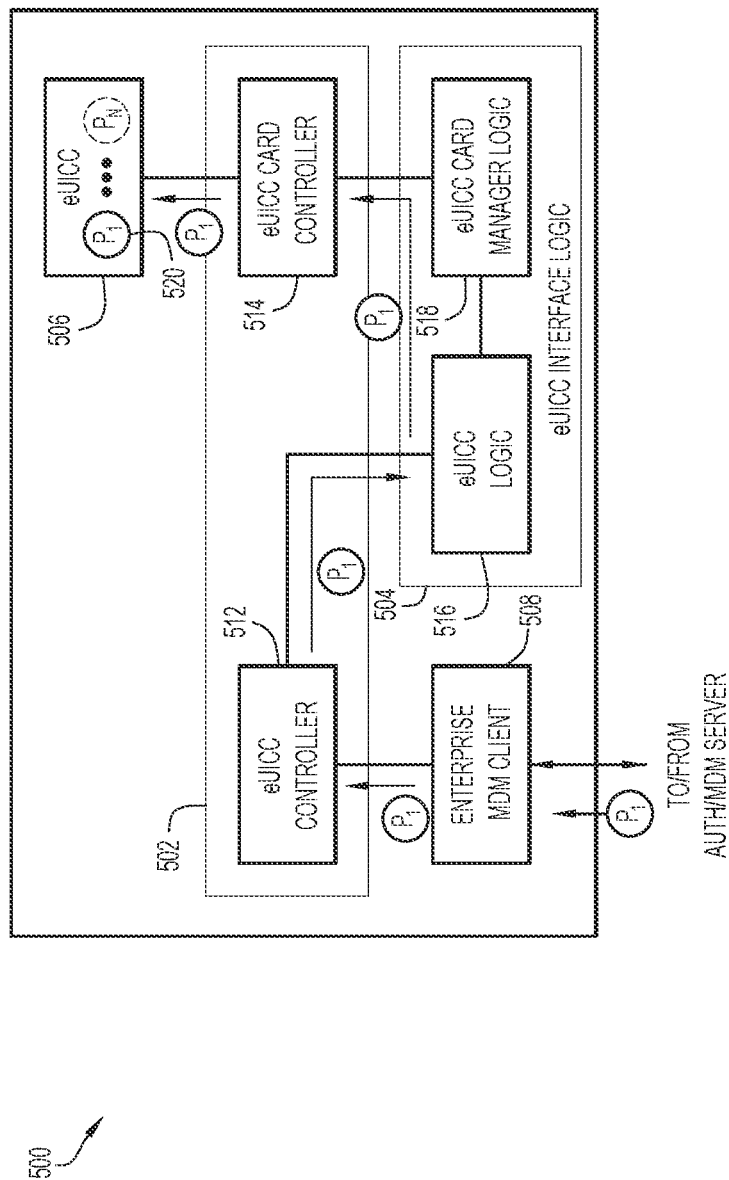
FIGS. 5A and 5B are diagrams illustrated example enterprise UE details associated with eSIM profile provisioning techniques, according to various example embodiments.
Figure 5B:
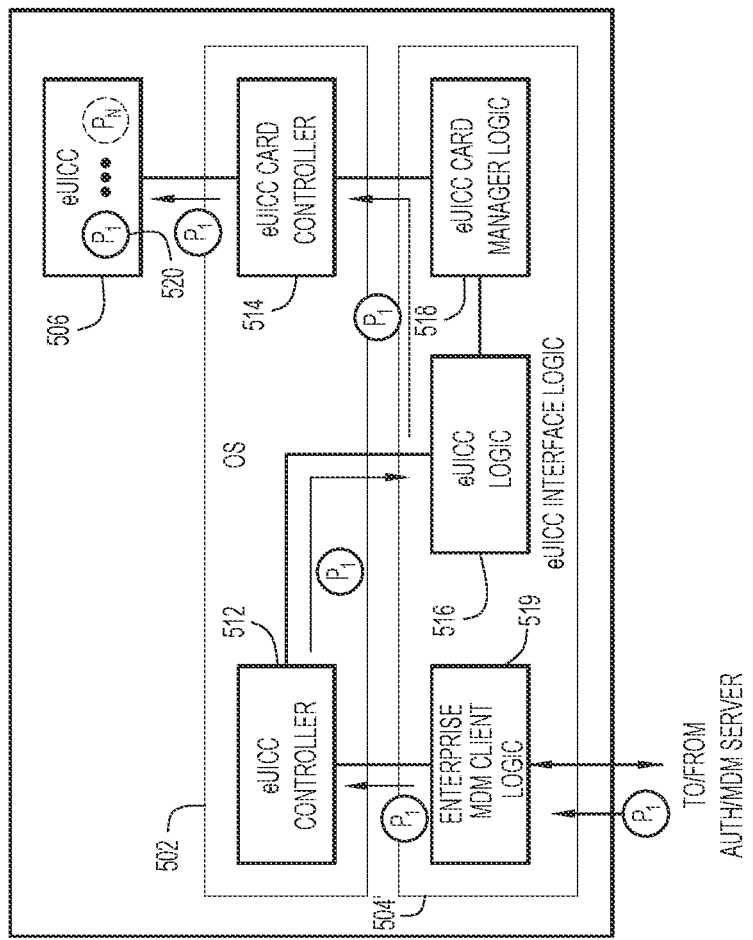

Referring to FIGS. 5A and 5B, FIGS. 5A and 5B are diagrams illustrated example enterprise UE details associated with eSIM profile provisioning techniques discussed herein, according to various example embodiments.

FIG. 5A illustrates a first configuration for an enterprise UE 500 in which enterprise UE 500 may include an operating system (OS) 502, eUICC interface logic 504, an eUICC 506, and an enterprise MDM client 508. OS 502 may include a eUICC controller 512 and a eUICC card controller 514. The eUICC interface logic 504 may include eUICC logic 516 and eUICC card manager logic 518. The eUICC 506 may be provisioned with one or more eSIM profile(s) 520 (e.g., $P_1$-$P_N$).

For the embodiment of FIG. 5A, enterprise MDM client 508 may be configured to interface with an auth/MDM server (e.g., auth/MDM server 112) to exchange one or more communications (e.g., receive commands, send responses, etc.) to facilitate obtaining one or more eSIM profile(s) 520 (e.g., $P_1$) for enterprise UE 500 using various techniques as discussed herein. Enterprise MDM client 508 may further interface with eUICC controller 512, which may further interface with eUICC logic 516 of eUICC interface logic 504.

During operation, one or more obtained eSIM profile(s) can be passed to eUICC controller 512, which may find the eUICC logic 516 and forward the eSIM profile(s) accordingly. The eUICC logic 516 may interface with eUICC card manager logic 518, which may further interface with eUICC card controller 514 (e.g., via the ES10x) interface. During operation, eUICC card manager logic 518 may obtain the eSIM profile(s) 520 and facilitate management of the eSIM profile(s) 520 automatically and/or based on user inputs. For example, in one embodiment, eUICC card manager logic 518 may facilitate a user interface (UI) to enable a user of enterprise UE to manage one or more eSIM profile(s) 520. The eSIM profile(s) can be passed to eUICC card controller 514 and installed/embedded on eUICC 506. The eUICC card manager logic 518 may also facilitate activating a particular eSIM profile, deactivating a particular eSIM profile, and/or deleting one or eSIM profiles during operation in order to manage one or more eSIM profile(s) 520 for the enterprise UE 500.

FIG. 5B illustrates a first configuration for an enterprise UE 500' in which enterprise UE 500' may include the OS 502 (including eUICC controller 512 and eUICC card controller 514) and the eUICC 506 as shown in FIG. 5A; however, customized eUICC interface logic 504' may be configured for enterprise UE 500' that includes enterprise MDM client logic 519 in addition to the eUICC logic 518 and the eUICC card manager logic 518. Thus, as illustrated by the embodiment of FIG. 5B, customized eUICC interface logic can be configured for an enterprise UE, such as customized eUICC interface logic 504' for enterprise UE 500' that includes enterprise MDM client logic 519, which may facilitate interfacing with an auth/MDM server (e.g., auth/MDM server 112) and the eUICC controller 512 in some embodiments.

Although not illustrated in FIGS. 5A and 5B, it is to be understood that enterprise UE 500/500' can be configured with any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate any combination of WLA and/or WWA access network connections. In some instances, enterprise UE 500/500' may also be capable of wired interface connections.

Figure 6:
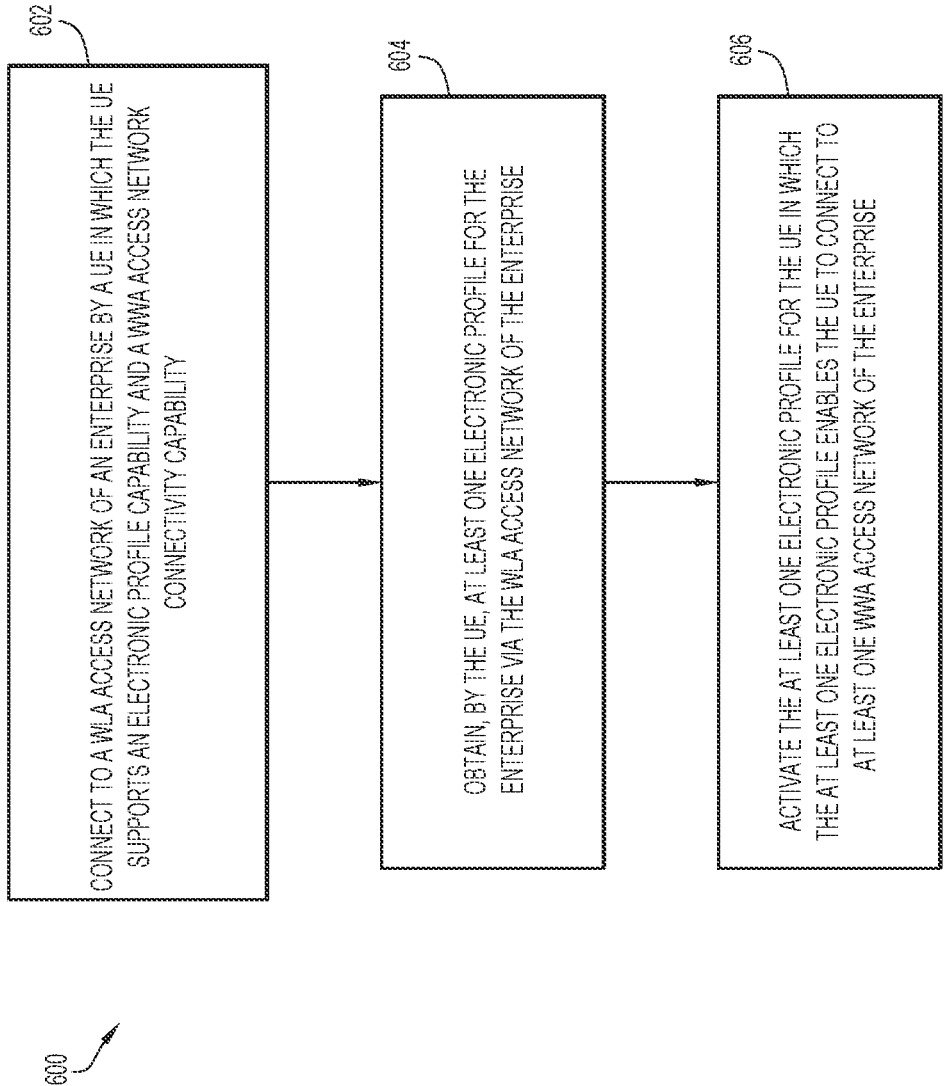
FIG. 6 is a flow chart depicting another method according to an example embodiment.

Referring to FIG. 6, FIG. 6 is a flow chart depicting another method according to an example embodiment. In particular, method 600 illustrates example operations that may be performed by a UE, such as any of enterprise UE 140 of FIGS. 1 and 2, enterprise UE 500 of FIG. 5A, and/or enterprise UE 500' of FIG. 5B in at least one embodiment.

At 602, the method may include connecting to a WLA access network of an enterprise by the UE in which the UE supports an electronic profile capability (e.g., an eSIM profile capability) and a WWA access network connectivity capability.

At 604, the method may include obtaining, by the UE, at least one electronic profile from the enterprise via the WLA access network of the enterprise. The UE may obtain the at least one electronic profile via MDM protocol messaging exchanges with an enterprise management node (e.g., enterprise management node 110) as discussed for various embodiments herein.

606, the method may include activating the at least one electronic profile for the UE in which the at least one electronic profile enables the UE to connect to at least one WWA access network of the enterprise (e.g., a private 4G/5G/nG network, a private CBRS network, etc.).

Referring to FIG. 7, FIG. 7 illustrates a hardware block diagram of a computing device 700 that may perform functions associated with operations discussed herein in connection with the techniques depicted in FIGS. 1-7. In various embodiments, a computing device, such as computing device 700 or any combination of computing devices 700, may be configured an elements/devices/nodes as discussed for the techniques depicted in connection with FIGS. 1-7. In one embodiment, computing device 700 may be configured as an enterprise management node, such as enterprise management node 110. However, in some embodiments, computing device 700 may be configured as an enterprise UE, such as any of enterprise UE 140 of FIGS. 1 and 2, enterprise UE 500 of FIG. 5A, and/or enterprise UE 500' of FIG. 5B. In still some embodiments, computing device 700 or any combination of computing devices may be configured as any of WLA radio node(s) 122, WWA radio node(s) 124, and/or another other element/entity as discussed for embodiments herein.

It should be appreciated that FIG. 7 provides only an illustration of one embodiment and does not imply any limitations with regard to the environments in which different embodiments may be implemented. Many modifications to the depicted environment may be made.

As depicted, the computing device 700 includes a bus 712, which provides communications between computer processor(s) 714, memory 716, persistent storage 718, at least one communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media, which can be inclusive on non-transitory computer readable storage media. In the depicted embodiment, memory 716, which may be inclusive of one or more memory element(s), includes random access memory (RAM) 724 and cache memory 726. In general, memory 716 can include any suitable volatile or non-volatile computer readable storage media. Instructions for control logic 740 may be stored in memory 716 and/or persistent storage 718 for execution by processor(s) 714. Control logic 740 may include any combination of functionality, clients, controllers, logic, etc. discussed for various embodiments herein.

When the processor(s) 714 execute control logic 740, the processor(s) 714 are caused to perform the operations described above in connection with FIGS. 1-6. For example, when control logic 740 is configured for an enterprise management node, such as enterprise management node 110, when processor(s) 714 execute control logic 740, the processor(s) 714 may be caused to perform operations such as determining whether a UE (e.g., enterprise UE 140) supports an electronic profile capability and a WWA access network connectivity capability; and based on determining that the UE supports the electronic profile capability and the WWA access network connectivity capability, providing at least one electronic profile to the UE via a WLA access network of the enterprise network in which the at least one electronic profile enables the UE to connect to at least one WWA access network of the enterprise network.

For embodiments in which computing device 700 is configured as any other entity discussed herein (e.g., any of enterprise UE 140, 500, 500' etc.), when processor(s) 714 execute control logic 740, the processor(s) 714 may be caused to perform operations as discussed herein with reference to FIGS. 1-6. For example, when control logic 740 is configured for a UE, such as any of UE 140, 500, and/or 500', when processor(s) 714 execute control logic 740, the processor(s) 714 may be caused to perform operations such as connecting to a WLA access network of an enterprise by the UE; obtaining at least one electronic profile from the enterprise via the WLA access network; and activating the at least one electronic profile in which the at least one electronic profile enables the UE to connect to at least one WWA access network of the enterprise.

One or more programs and/or other logic may be stored in persistent storage 718 for execution by one or more of the respective computer processors 714 via one or more memory element(s) of memory 716. The persistent storage 718 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems, networks, and/or devices. In these examples, each communications unit 720 may include at least one interface (IF) 721, which may facilitate communications with systems, networks, and/or devices utilizing any combination of hardware, software, etc. to facilitate one or more connections for communications discussed herein. Accordingly, communications unit 720 may provide communications through the use of any combination of physical and/or wireless communications links.

I/O interface(s) 722 allows for input and output of data with other devices that may be connected to computing device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor and/or any other display device.

In summary, techniques herein may facilitate eSIM profile management by an enterprise entity in which the enterprise entity can utilize an enterprise infrastructure or system to provision one or more eSIM profiles for one or more enterprise UE(s).

In one form, a computer-implemented method is provided that may include determining, by a management node of an enterprise network, whether a user equipment (UE) supports an electronic profile capability and a wireless wide area access network connectivity capability; and based on determining that the UE supports the electronic profile capability and the wireless wide area access network connectivity capability, providing, by the management node, at least one electronic profile to the UE via a wireless local area access network of the enterprise network, wherein the at least one electronic profile enables the UE to connect to at least one wireless wide area access network of the enterprise network.

In at least one implementation, the at least one electronic profile is at least one electronic subscriber identity module (eSIM) profile that enables the UE to connect to the at least one wireless wide area access network of the enterprise network.

In various instances, the at least one wireless wide area access network is at least one of: a private 3rd Generation Partnership Project (3GPP) Fourth Generation (4G) network; a private 3rd Generation Partnership Project (3GPP) Fifth Generation (5G) network; a private 3rd Generation Partnership Project (3GPP) next Generation (nG) network; and a private Citizens Broadband Radio Service (CBRS) network.

In at least one instance, providing the at least one electronic profile to the UE includes sending a Mobile Device Management (MDM) protocol command to the UE via the wireless local area access network of the enterprise network. In at least one instance, the MDM protocol command indicates that the UE is to install and activate the at least one electronic profile and the at least one electronic profile is included with the MDM protocol command. In at least one instance, the MDM protocol command indicates that the UE is to install and activate the at least one electronic profile upon obtaining the at least one electronic profile from a network location, wherein the network location is included with the MDM protocol command.

In at least one instance, the management node of the enterprise network determines that the UE supports the electronic profile capability and the wireless wide area access network connectivity capability based on a certificate associated with the UE. In at least one instance, the management node of the enterprise network determines that the UE supports the electronic profile capability and the wireless wide area access network connectivity capability based on capability information obtained by the management node through authentication or association of the UE to the wireless local area access network of the enterprise network or through determining capabilities of the UE via one or more databases.

In at least one instance, the method may include sending, by the management node, a message to the UE, wherein the message indicates that the UE is to delete or deactivate the at least one electronic profile. In at least one instance, a plurality of electronic profiles can be provided to the UE by the management node of the enterprise network and the method may further include sending, by the management node, a message to the UE, wherein the message indicates that the UE is to activate a particular electronic profile of the plurality of electronic profiles.

In one form, another computer-implemented method is provided that includes connecting to a wireless local area access network of an enterprise by a user equipment (UE), wherein the UE supports an electronic profile capability and a wireless wide area access network connectivity capability; obtaining, by the UE, at least one electronic profile from the enterprise via the wireless local area access network; and activating the at least one electronic profile for the UE, wherein the at least one electronic profile enables the UE to connect to at least one wireless wide area access network of the enterprise.

In at least one instance, the at least one electronic profile is at least one electronic subscriber identity module (eSIM) profile that enables the UE to connect to the at least one wireless wide area access network of the enterprise. In at least one instance, the obtaining includes downloading the at least one electronic profile from a network location of the enterprise. In at least one instance, the obtaining includes obtaining the at least one electronic profile in a message obtained from the enterprise.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'commands', 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), wireless WAN (WWAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, WWAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating, by a management node of an enterprise network, a plurality of electronic profiles for an enterprise user of the enterprise network, wherein the enterprise user is associated with a plurality of enterprise devices and each electronic profile of the plurality of electronic profiles comprises an employee identifier for the enterprise user and one or more enterprise policies for the enterprise user for each of an enterprise location of a plurality of enterprise locations;
determining, by the management node of the enterprise network, that a particular enterprise device of the plurality of enterprise devices of the enterprise user supports an electronic profile capability and a wireless wide area access network connectivity capability; and
based on determining that the particular enterprise device supports the electronic profile capability and the wireless wide area access network connectivity capability, assigning at least one electronic profile of the plurality of electronic profiles to the particular enterprise device and providing, by the management node, the at least one electronic profile to the particular enterprise device via a wireless local area access network of the enterprise network, wherein the at least one electronic profile enables the particular enterprise device to connect to at least one wireless wide area access network of the enterprise network.

2. The method of claim 1, wherein the at least one electronic profile is at least one electronic subscriber identity module (eSIM) profile that enables the particular enterprise device to connect to the at least one wireless wide area access network of the enterprise network.

3. The method of claim 1, wherein the at least one wireless wide area access network is at least one of:
a private 3rd Generation Partnership Project (3GPP) Fourth Generation (4G) network;
a private 3rd Generation Partnership Project (3GPP) Fifth Generation (5G) network;
a private 3rd Generation Partnership Project (3GPP) next Generation (nG) network; and
a private Citizens Broadband Radio Service (CBRS) network.

4. The method of claim 1, wherein providing the at least one electronic profile to the particular enterprise device includes sending a Mobile Device Management (MDM) protocol command to the particular enterprise device via the wireless local area access network of the enterprise network.

5. The method of claim 4, wherein the MDM protocol command indicates that the particular enterprise device is to install and activate the at least one electronic profile and the at least one electronic profile is included with the MDM protocol command.

6. The method of claim 4, wherein the MDM protocol command indicates that the particular enterprise device is to install and activate the at least one electronic profile upon obtaining the at least one electronic profile from a network location of the enterprise network, wherein the network location is included with the MDM protocol command.

7. The method of claim 1, wherein the management node of the enterprise network determines that the particular enterprise device supports the electronic profile capability and the wireless wide area access network connectivity capability based on a certificate obtained from the particular enterprise device.

8. The method of claim 1, further comprising:
sending, by the management node, a message to the particular enterprise device, wherein the message indicates that the particular enterprise device is to delete or deactivate the at least one electronic profile.

9. The method of claim 1, wherein a first electronic profile of the plurality of electronic profiles comprises one or more first enterprise policies for the enterprise user for a first enterprise location of the plurality of enterprise locations and a second electronic profile of the plurality of electronic profiles comprises one or more second enterprise policies for the enterprise user for a second enterprise location of the plurality of enterprise locations and wherein at least one of the one or more first enterprise policies for the enterprise user for the first enterprise location is different from at least one of the one or more second enterprise policies for the enterprise user for the second enterprise location.

10. The method of claim 1, wherein the determining is based on capability information obtained by the management node from the particular enterprise device through authentication or association of the particular enterprise device to a wireless local area access network of the enterprise network in which the capability information indicates that the particular enterprise device supports the electronic profile capability and the wireless wide area access network connectivity capability.

11. One or more non-transitory computer readable storage media encoded with instructions that, when executed by a processor, cause the processor to perform operations, comprising:
generating, by a management node of an enterprise network, a plurality of electronic profiles for an enterprise user of the enterprise network, wherein the enterprise user is associated with a plurality of enterprise devices and each electronic profile of the plurality of electronic profiles comprises an employee identifier for the enterprise user and one or more enterprise policies for the enterprise user for each of an enterprise location of a plurality of enterprise locations;
determining, by the management node of the enterprise network, that a a particular enterprise device of the plurality of enterprise devices of the enterprise user supports an electronic profile capability and a wireless wide area access network connectivity capability; and
based on determining that the particular enterprise device supports the electronic profile capability and the wireless wide area access network connectivity capability, assigning at least one electronic profile of the plurality of electronic profiles to the particular enterprise device and providing, by the management node, the at least one electronic profile to the particular enterprise device via a wireless local area access network of the enterprise network, wherein the at least one electronic profile enables the particular enterprise device to connect to at least one wireless wide area access network of the enterprise network.

12. The media of claim 11, wherein the at least one electronic profile is at least one electronic subscriber identity module (eSIM) profile that enables the particular enterprise device to connect to the at least one wireless wide area access network of the enterprise network.

13. The media of claim 11, wherein providing the at least one electronic profile to the particular enterprise device includes sending a Mobile Device Management (MDM) protocol command to the particular enterprise device via the wireless local area access network of the enterprise network.

14. The media of claim 13, wherein the MDM protocol command indicates that the particular enterprise device is to install and activate the at least one electronic profile and the at least one electronic profile is included with the MDM protocol command.

15. The media of claim 13, wherein the MDM protocol command indicates that the particular enterprise device is to install and activate the at least one electronic profile upon obtaining the at least one electronic profile from a network location, wherein the network location is included with the MDM protocol command.

16. The media of claim 11, the operations further comprising:
sending, by the management node, a message to the particular enterprise device, wherein the message indicates that the particular enterprise device is to delete or deactivate the at least one electronic profile.

17. A management node of an enterprise network, comprising:
at least one memory element for storing data; and
at least one processor for executing instructions associated with the data, wherein executing the instructions causes the management node to perform operations, comprising:
generating, a plurality of electronic profiles for an enterprise user of the enterprise network, wherein the enterprise user is associated with a plurality of enterprise devices and each electronic profile of the plurality of electronic profiles comprises an employee identifier for the enterprise user and one or more enterprise policies for the enterprise user for each of an enterprise location of a plurality of enterprise locations;
determining, by the management node of the enterprise network, that a particular enterprise device of the plurality of enterprise devices of the enterprise user supports an electronic profile capability and a wireless wide area access network connectivity capability; and
based on determining that the particular enterprise device supports the electronic profile capability and the wireless wide area access network connectivity capability, assigning at least one electronic profile of the plurality of electronic profiles to the particular enterprise device and providing, by the management node, the at least one electronic profile to the particular enterprise device via a wireless local area access network of the enterprise network, wherein the at least one electronic profile enables the particular enterprise device to connect to at least one wireless wide area access network of the enterprise network.

18. The management node of claim 17, wherein the at least one electronic profile is at least one electronic subscriber identity module (eSIM) profile that enables the particular enterprise device to connect to the at least one wireless wide area access network of the enterprise network.

19. The management node of claim 17, wherein providing the at least one electronic profile to the particular enterprise device includes sending a Mobile Device Management (MDM) protocol command to the particular enterprise device via the wireless local area access network of the enterprise network.

20. The management node of claim 19, wherein the MDM protocol command indicates that the particular enterprise device is to install and activate the at least one electronic profile and the at least one electronic profile is included with the MDM protocol command.

* * * * *